United States Patent
Hong et al.

(10) Patent No.: US 12,378,723 B2
(45) Date of Patent: Aug. 5, 2025

(54) FRUIT EXTRACT LEATHER AND PREPARATION METHOD THEREOF

(71) Applicant: Kin Hong, Hong Kong (CN)

(72) Inventors: Kin Hong, Hong Kong (CN); Chunli Qiu, Shandong (CN)

(73) Assignee: Kin Hong, Hong Kong (CN)

( * ) Notice: Subject to any disclaimer, the term of this patent is extended or adjusted under 35 U.S.C. 154(b) by 0 days.

(21) Appl. No.: 18/058,723

(22) Filed: Nov. 23, 2022

(65) Prior Publication Data
US 2023/0088764 A1   Mar. 23, 2023

Related U.S. Application Data

(63) Continuation of application No. PCT/CN2021/127206, filed on Oct. 28, 2021.

(30) Foreign Application Priority Data

Oct. 30, 2020   (HK) .......................... 32020019339.1

(51) Int. Cl.
  *D06N 3/00*   (2006.01)
  *D01F 2/08*   (2006.01)

(52) U.S. Cl.
  CPC ............ *D06N 3/0061* (2013.01); *D01F 2/08* (2013.01); *D06N 3/0036* (2013.01); *D06N 2201/02* (2013.01); *D06N 2201/04* (2013.01); *D06N 2209/1614* (2013.01); *D06N 2211/106* (2013.01); *D06N 2211/28* (2013.01)

(58) Field of Classification Search
  CPC ................................ D06N 3/0061; A21D 2/36
  See application file for complete search history.

(56) References Cited

U.S. PATENT DOCUMENTS

| | | | | |
|---|---|---|---|---|
| 2009/0301347 A1* | 12/2009 | Volcan | ...................... | A23B 7/02 106/206.1 |
| 2010/0247895 A1* | 9/2010 | Uemura | .................. | B32B 27/18 156/331.7 |
| 2016/0168275 A1* | 6/2016 | Santanocito | ............ | C08B 16/00 162/99 |
| 2021/0179867 A1* | 6/2021 | De Almeida Morgado | .................. | D21H 19/62 |
| 2021/0189642 A1* | 6/2021 | Parth | .................... | D06M 15/564 |
| 2022/0411998 A1* | 12/2022 | Santanocito | ............. | D06N 3/14 |

FOREIGN PATENT DOCUMENTS

| | | |
|---|---|---|
| CN | 107988652 A | 5/2018 |
| CN | 109468697 A | 3/2019 |
| CN | 111344451 A | 6/2020 |
| JP | 2009544861 A | 12/2009 |
| JP | 2011168902 A | 9/2011 |
| WO | 2019076999 A1 | 4/2019 |
| WO | WO-2020027683 A1 * | 2/2020 ............. A21D 13/04 |
| WO | 2024078705 A1 | 4/2024 |

OTHER PUBLICATIONS

International Search Report of PCT Patent Application No. PCT/CN2021/127206 issued on Jan. 25, 2022.
Qiang Taotao, Synthetic Leather Chemicals, Jul. 2016, p. 44, 1st edition, Beijing: China Light Industry Press.
1 Extended European Search Report of European Patent Application No. 21885282.0 issued on Feb. 10, 2025.

* cited by examiner

*Primary Examiner* — Larissa Rowe Emrich

(57) ABSTRACT

This application provides a fruit extract leather. The fruit extract leather includes a prepolymer material A, a prepolymer material B, and a base fabric. The prepolymer material A includes a fruit powder, and the fruit powder is obtained by grinding a remaining residue material obtained after fruit peels and/or fruit kernels are extracted. This application further provides a method for preparing the fruit extract leather. According to the fruit extract leather and the preparation method thereof provided in this application, polyester and other components in leather are substituted, fruit peels and/or fruit kernels are recycled, and waste and environmental pollution are reduced.

8 Claims, No Drawings

FRUIT EXTRACT LEATHER AND PREPARATION METHOD THEREOF

CROSS-REFERENCE TO RELATED APPLICATIONS

The present application is a continuation application of PCT application No. PCT/CN2021/127206 filed on Oct. 28, 2021, which claims the benefit of Hong Kong Short-term Patent Application No. 32020019339.1 filed on Oct. 30, 2020, each of which is incorporated by reference herein in its entirety.

TECHNICAL FIELD

The present disclosure belongs to the field of the light and textile industry, and specifically relates to a fruit extract leather and a preparation method thereof.

BACKGROUND

Synthetic leather is a substitute material for leather. With improvement of people's living standards, people are gradually pursuing high-quality daily products, and demands for leather products are increasing. With enhancement of the awareness of protecting animals, people's use demands for animal skins can no longer be met, and synthetic leather products have gradually become a development trend in the future. The synthetic leather has been widely used in production of bags and suitcases, clothes, shoes, and other products.

The synthetic leather currently used includes a prepolymer material A, a prepolymer material B, and a base fabric. The base fabric contains chemical fibers (polyester) and other components, so that the environment is influenced during use and subsequent waste disposal. In addition, after juicing or other processing of fruits, fruit peels and/or fruit kernels are basically discarded, and cannot be recycled, so that great waste is caused, and environmental protection is not facilitated.

SUMMARY

In view of the above-mentioned shortcomings, a technical problem to be solved by the present disclosure is to provide a fruit extract leather. Polyester and other components in leather are substituted, fruit peels and/or fruit kernels are recycled, and waste and environmental pollution are reduced.

In order to resolve the foregoing technical problems, technical solutions adopted by the present invention are: A fruit extract leather includes a prepolymer material A, a prepolymer material B, and a base fabric. The prepolymer material A includes a fruit powder, and the fruit powder is obtained by grinding a remaining residue material obtained after fruit peels and/or fruit kernels are extracted.

As an optimized solution, the prepolymer material A has a fruit powder content of 20%-50% by weight percentage.

As an optimized solution, the base fabric is obtained by performing spinning and yarn spinning on an extract obtained after the fruit peels and/or fruit kernels are extracted.

As an optimized solution, the fruit powder includes one or more of apples, lemons, oranges, and sugar cane.

A method for preparing a fruit extract leather includes the following steps:

(1) extracting juiced fruit peels and/or fruit kernels to obtain a powdery fruit extract and a remaining residue for spare use;

(2) sequentially adding the fruit extract, a dispersing agent, and a cross-linking agent to water, performing uniform mixing, heating, and heat preservation, and then performing filtration to obtain a supernatant, namely a fruit extract mixed solution, and a residue for spare use;

(3) preparation of a viscose spinning solution: performing impregnation, pressing, pulverization, aging, yellowing, dissolution, filtration, and defoaming on pulp to obtain a viscose spinning solution;

(4) spinning: uniformly mixing the fruit extract mixed solution obtained in step (2) and the viscose spinning solution obtained in step (3) by pre-spinning injection, performing spinning to obtain a composite fiber containing a golden fruit extract, and then performing yarn spinning to obtain a base fabric;

(5) grinding the residues obtained in step (1) and step (2), and adding the ground residues to a prepolymer material A to obtain a new prepolymer material A; and (6) compounding the obtained base fabric, new prepolymer material A, and a prepolymer material B to obtain a finished product.

As an optimized solution, in step (2), the fruit extract mixed solution has a solid content of 10%.

As an optimized solution, a weight ratio of the fruit extract in the fruit extract mixed solution to $\alpha$-cellulose in the viscose spinning solution is 0.1:1.

As an optimization scheme, in step (2), the dispersing agent is a mixture of sodium dodecylbenzenesulfonate and fatty alcohol polyether; a weight ratio of the fruit extract to the sodium dodecylbenzenesulfonate to the fatty alcohol polyether to the cross-linking agent to the water is 1:(0.01-0.05):(0.005-0.05):(2-8):(3-5); and in step (2), the cross-linking agent is any one or a combination of fatty acid alkylolamide, propylene glycol diglycidyl ether, dimethylolurea, or dimethylol ethyleneurea.

As an optimized solution, in step (3), an alkali cellulose obtained after the aging has a copper ammonia viscosity of 75-85 mPa·s;

in step (3), the yellowing is performed at an initial temperature of 24-28° C. and a termination temperature of 29-33° C.;

in step (3), a weight ratio of carbon disulfide to the $\alpha$-cellulose in a yellowing process is (0.28-0.36):1; and in step (3), the viscose spinning solution has an $\alpha$-cellulose content of 8.65-9.13 wt. %, an alkali content of 4.7-4.98 wt. %, a viscosity of 52-64 s, and a maturity of 11-15 ml.

As an optimized solution, the method further includes post-processing steps: after the spinning is completed, sequentially performing drafting, plasticization, cutting, refining, and drying, and after the steps are completed, obtaining a composite fiber containing a fruit extract.

The technical solutions adopted the embodiments of the present invention have the following advantages.

1. In the present disclosure, as the fruit residue powder and the fruit base fabric are added to the prepolymer material A to replace relevant polyester and other components, functions of the prepolymer material A are not decreased, the content of a biomass material is greatly increased by 60%-80%, and 100% bio-carbonization treatment is achieved.

2. In the present disclosure, as the fruit residue powder and the fruit base fabric are added to the prepolymer material A to replace relevant polyester and other components, the fruit peel and/or fruit kernel waste is recycled, the production cost is reduced, and environmental pollution is reduced.

3. As the base fabric used in the patent of the present disclosure contains an extract of the fruit peels and/or fruit kernels, the base fabric is a biomass fiber, which is safe and environmentally friendly, and can be completely degraded without environmental pollution.

4. According to the novel preparation method used in the present disclosure, the fruit peels and/or fruit kernels are full utilized, the technical problem that fruit peels and/or fruit kernels cannot be recycled is solved, and great economic and social benefits are generated.

DETAILED DESCRIPTION

The technical solutions of embodiments of the present invention are clearly and completely described below with reference to the descriptions in the embodiments of the present invention. Obviously, the described embodiments are merely a part rather than all of the embodiments of the present invention. All other embodiments obtained by a person of ordinary skill in the art based on the embodiments of the present invention without creative efforts shall fall within the protection scope of the present invention.

Example I: A fruit extract leather includes a prepolymer material A, a prepolymer material B, and a base fabric. The prepolymer material A includes a fruit powder, and the fruit powder is obtained by grinding a remaining residue material obtained after fruit peels and/or fruit kernels are extracted.

The prepolymer material A has a fruit residue powder content of 20%-50% by weight percentage.

The base fabric is obtained by performing spinning and yarn spinning on an extract obtained after the fruit peels and/or fruit kernels are extracted.

The prepolymer material A is a polyether (or polyester) polyol mixture, the prepolymer material B is an isocyanate prepolymer, and a weight ratio of the prepolymer material A to the prepolymer material B is 1:1.

The fruit powder includes one or more of apples, lemons, oranges, and sugar cane, and other fruits may also be used as required.

Example II: A method for preparing a fruit extract leather includes the following steps:
(1) extracting juiced fruit peels and/or fruit kernels to obtain a powdery fruit extract and a remaining residue for spare use;
(2) sequentially adding the fruit extract, a dispersing agent, and a cross-linking agent to water, performing uniform mixing, heating, and heat preservation, and then performing filtration to obtain a supernatant, namely a fruit extract mixed solution, and a residue for spare use;
(3) preparation of a viscose spinning solution: performing impregnation, pressing, pulverization, aging, yellowing, dissolution, filtration, and defoaming on pulp to obtain a viscose spinning solution;
(4) spinning: uniformly mixing the fruit extract mixed solution obtained in step (2) and the viscose spinning solution obtained in step (3) by pre-spinning injection, performing spinning to obtain a composite fiber containing a golden fruit extract, and then performing yarn spinning to obtain a base fabric;
(5) grinding the residues obtained in step (1) and step (2), and adding the ground residues to a prepolymer material A to obtain a composite prepolymer material A; and
(6) compounding the obtained base fabric, composite prepolymer material A, and a prepolymer material B to obtain a finished product.

The method further includes post-processing steps: after the spinning is completed, sequentially performing drafting, plasticization, cutting, refining, and drying, and after the steps are completed, obtaining a composite fiber containing a fruit extract.

In step (2), the fruit extract mixed solution has a solid content of 10%, and a weight ratio of the fruit extract in the fruit extract mixed solution to α-cellulose in the viscose spinning solution is 0.1:1.

Preparation of the fruit extract mixed solution: The fruit extract, sodium dodecylbenzenesulfonate, fatty alcohol polyether, and fatty acid alkylolamide are sequentially added to water, where a weight ratio of the fruit extract to the sodium dodecylbenzenesulfonate to the fatty alcohol polyether to the fatty acid alkylolamide to the water is 1:0.012:0.006:2.5:3. The above-mentioned substances are uniformly mixed, heated to 40° C., and subjected to heat preservation for 45 min to obtain a mixture. Then, the mixture is sequentially filtered with a 300-mesh filter screen, a 400-mesh filter screen, and a 500-mesh filter screen. A bottom residue is removed, and a supernatant is taken to obtain the fruit extract mixed solution.

Preparation of the viscose spinning solution: Short-filament cotton pulp is subjected to impregnation in a sodium hydroxide solution, and then subjected to pressing, pulverization, and aging to obtain an alkali cellulose with a copper ammonia viscosity of 75 mPa·s. Carbon disulfide that is 31% of a weight ratio of α-cellulose is added in a yellowing process, and the yellowing is performed at an initial temperature of 27° C. and a termination temperature of 31° C. to obtain cellulose xanthate. At last, the cellulose xanthate is subjected to dissolution, filtration, and defoaming to obtain the viscose spinning solution with an α-cellulose content of 8.65 wt. %, an alkali content of 4.7 wt. %, a viscosity of 55 s, and a maturity of 13.5 ml.

Spinning: The fruit extract mixed solution obtained in step (1) and the viscose spinning solution obtained in step (2) are uniformly mixed by pre-spinning injection, where a weight ratio of the fruit extract in the fruit extract mixed solution to α-cellulose in the viscose spinning solution is 0.05:1. After that, wet spinning with an acid bath is performed, where the acid bath includes sulfuric acid with a concentration of 100 g/L, zinc sulfate with a concentration of 15 g/L, and sodium sulfate with a concentration of 300 g/L, and has a temperature of 50° C. After the spinning is completed, the processes of drafting, plasticization, cutting, acid pickling, desulfurization with sodium sulfite, water washing, oiling, and drying are sequentially performed, and then the composite fiber containing a fruit extract is obtained.

Example III: A method for preparing a fruit extract leather includes the following steps:
(1) extracting juiced fruit peels and/or fruit kernels to obtain a powdery fruit extract and a remaining residue for spare use;
(2) sequentially adding the fruit extract, a dispersing agent, and a cross-linking agent to water, performing uniform mixing, heating, and heat preservation, and then performing filtration to obtain a supernatant, namely a fruit extract mixed solution, and a residue for spare use;
(3) preparation of a viscose spinning solution: performing impregnation, pressing, pulverization, aging, yellowing, dissolution, filtration, and defoaming on pulp to obtain a viscose spinning solution;

(4) spinning: uniformly mixing the fruit extract mixed solution obtained in step (2) and the viscose spinning solution obtained in step (3) by pre-spinning injection, performing spinning to obtain a composite fiber containing a golden fruit extract, and then performing yarn spinning to obtain a base fabric;

(5) grinding the residues obtained in step (1) and step (2), and adding the ground residues to a prepolymer material A to obtain a composite prepolymer material A; and (6) compounding the obtained base fabric, composite prepolymer material A, and a prepolymer material B to obtain a finished product.

The method further includes post-processing steps: after the spinning is completed, sequentially performing drafting, plasticization, cutting, refining, and drying, and after the steps are completed, obtaining a composite fiber containing a fruit extract.

In step (2), the fruit extract mixed solution has a solid content of 10%, and a weight ratio of the fruit extract in the fruit extract mixed solution to α-cellulose in the viscose spinning solution is 0.1:1.

Preparation of the fruit extract mixed solution: The fruit extract, sodium dodecylbenzenesulfonate, fatty alcohol polyether, and propylene glycol diglycidyl ether are sequentially added to water, where a weight ratio of the fruit extract to the sodium dodecylbenzenesulfonate to the fatty alcohol polyether to the propylene glycol diglycidyl ether to the water is 1:0.025:0.015:4:4. The above-mentioned substances are uniformly mixed, heated to 50° C., and subjected to heat preservation for 60 min to obtain a mixture. Then, the mixture is sequentially filtered with a 300-mesh filter screen, a 400-mesh filter screen, and a 500-mesh filter screen. A bottom residue is removed, and a supernatant is taken to obtain the fruit extract mixed solution.

Preparation of the viscose spinning solution: Short-filament wood pulp is subjected to impregnation in a sodium hydroxide solution, and then subjected to pressing, pulverization, and aging to obtain an alkali cellulose with a copper ammonia viscosity of 85 mPa·s. Carbon disulfide that is 33% of a weight ratio of α-cellulose is added in a yellowing process, and the yellowing is performed at an initial temperature of 26° C. and a termination temperature of 31° C. to obtain cellulose xanthate. At last, the cellulose xanthate is subjected to dissolution, filtration, and defoaming to obtain the viscose spinning solution with an α-cellulose content of 8.7 wt. %, an alkali content of 4.86 wt. %, a viscosity of 55 s, and a maturity of 12 ml.

Spinning: The fruit extract mixed solution obtained in step (1) and the viscose spinning solution obtained in step (2) are uniformly mixed by pre-spinning injection, where a weight ratio of the fruit extract in the fruit extract mixed solution to α-cellulose in the viscose spinning solution is 0.07:1. After that, wet spinning with an acid bath is performed, where the acid bath includes sulfuric acid with a concentration of 130 g/L, zinc sulfate with a concentration of 20 g/L, and sodium sulfate with a concentration of 350 g/L, and has a temperature of 55° C. After the spinning is completed, the processes of drafting, plasticization, cutting, acid pickling, desulfurization with sodium sulfite, water washing, oiling, and drying are sequentially performed, and then the composite fiber containing a fruit extract is obtained.

Example IV: A method for preparing a fruit extract leather includes the following steps:

(1) extracting juiced fruit peels and/or fruit kernels to obtain a powdery fruit extract and a remaining residue for spare use;

(2) sequentially adding the fruit extract, a dispersing agent, and a cross-linking agent to water, performing uniform mixing, heating, and heat preservation, and then performing filtration to obtain a supernatant, namely a fruit extract mixed solution, and a residue for spare use;

(3) preparation of a viscose spinning solution: performing impregnation, pressing, pulverization, aging, yellowing, dissolution, filtration, and defoaming on pulp to obtain a viscose spinning solution;

(4) spinning: uniformly mixing the fruit extract mixed solution obtained in step (2) and the viscose spinning solution obtained in step (3) by pre-spinning injection, performing spinning to obtain a composite fiber containing a golden fruit extract, and then performing yarn spinning to obtain a base fabric;

(5) grinding the residues obtained in step (1) and step (2), and adding the ground residues to a prepolymer material A to obtain a composite prepolymer material A; and (6) compounding the obtained base fabric, composite prepolymer material A, and a prepolymer material B to obtain a finished product.

The method further includes post-processing steps: after the spinning is completed, sequentially performing drafting, plasticization, cutting, refining, and drying, and after the steps are completed, obtaining a composite fiber containing a fruit extract.

In step (2), the fruit extract mixed solution has a solid content of 10%, and a weight ratio of the fruit extract in the fruit extract mixed solution to α-cellulose in the viscose spinning solution is 0.1:1.

Preparation of the fruit extract mixed solution: The fruit extract, sodium dodecylbenzenesulfonate, fatty alcohol polyether, and dimethylolurea are sequentially added to water, where a weight ratio of the fruit extract to the sodium dodecylbenzenesulfonate to the fatty alcohol polyether to the dimethylolurea to the water is 1:0.014:0.007:3.3:4. The above-mentioned substances are uniformly mixed, heated to 45° C., and subjected to heat preservation for 45 min to obtain a mixture. Then, the mixture is sequentially filtered with a 300-mesh filter screen, a 400-mesh filter screen, and a 500-mesh filter screen. A bottom residue is removed, and a supernatant is taken to obtain the fruit extract mixed solution.

Preparation of the viscose spinning solution: Short-filament wood pulp is subjected to impregnation in a sodium hydroxide solution, and then subjected to pressing, pulverization, and aging to obtain an alkali cellulose with a copper ammonia viscosity of 80 mPa·s. Carbon disulfide that is 31% of a weight ratio of α-cellulose is added in a yellowing process, and the yellowing is performed at an initial temperature of 27° C. and a termination temperature of 31° C. to obtain cellulose xanthate. At last, the cellulose xanthate is subjected to dissolution, filtration, and defoaming to obtain the viscose spinning solution with an α-cellulose content of 9.13 wt. %, an alkali content of 4.98 wt. %, a viscosity of 64 s, and a maturity of 15 ml.

Spinning: The fruit extract mixed solution obtained in step (1) and the viscose spinning solution obtained in step (2) are uniformly mixed by pre-spinning injection, where a weight ratio of the fruit extract in the fruit extract mixed solution to α-cellulose in the viscose spinning solution is 0.08:1. After that, wet spinning with an acid bath is performed, where the acid bath includes sulfuric acid with a concentration of 80 g/L, zinc sulfate with a concentration of 5 g/L, and sodium sulfate with a concentration of 260 g/L, and has a temperature of 45° C. After the spinning is completed, the processes of drafting, plasticization, cutting, acid pickling, desulfurization with sodium sulfite, water washing, oiling, and drying are sequentially performed, and then the composite fiber containing a fruit extract is obtained.

Example V: A method for preparing a fruit extract leather includes the following steps:
(1) extracting juiced fruit peels and/or fruit kernels to obtain a powdery fruit extract and a remaining residue for spare use;
(2) sequentially adding the fruit extract, a dispersing agent, and a cross-linking agent to water, performing uniform mixing, heating, and heat preservation, and then performing filtration to obtain a supernatant, namely a fruit extract mixed solution, and a residue for spare use;
(3) preparation of a viscose spinning solution: performing impregnation, pressing, pulverization, aging, yellowing, dissolution, filtration, and defoaming on pulp to obtain a viscose spinning solution;
(4) spinning: uniformly mixing the fruit extract mixed solution obtained in step (2) and the viscose spinning solution obtained in step (3) by pre-spinning injection, performing spinning to obtain a composite fiber containing a golden fruit extract, and then performing yarn spinning to obtain a base fabric;
(5) grinding the residues obtained in step (1) and step (2), and adding the ground residues to a prepolymer material A to obtain a composite prepolymer material A; and
(6) compounding the obtained base fabric, composite prepolymer material A, and a prepolymer material B to obtain a finished product.

The method further includes post-processing steps: after the spinning is completed, sequentially performing drafting, plasticization, cutting, refining, and drying, and after the steps are completed, obtaining a composite fiber containing a fruit extract.

In step (2), the fruit extract mixed solution has a solid content of 10%, and a weight ratio of the fruit extract in the fruit extract mixed solution to $\alpha$-cellulose in the viscose spinning solution is 0.1:1.

Preparation of the fruit extract mixed solution: The fruit extract, sodium dodecylbenzenesulfonate, fatty alcohol polyether, and dimethylol ethyleneurea are sequentially added to water, where a weight ratio of the fruit extract to the sodium dodecylbenzenesulfonate to the fatty alcohol polyether to the dimethylol ethyleneurea to the water is 1:0.01:0.005:2:4. The above-mentioned substances are uniformly mixed, heated to 20° C., and subjected to heat preservation for 120 min to obtain a mixture. Then, the mixture is sequentially filtered with a 300-mesh filter screen, a 400-mesh filter screen, and a 500-mesh filter screen. A bottom residue is removed, and a supernatant is taken to obtain the fruit extract mixed solution.

Preparation of the viscose spinning solution: Short-filament wood pulp is subjected to impregnation in a sodium hydroxide solution, and then subjected to pressing, pulverization, and aging to obtain an alkali cellulose with a copper ammonia viscosity of 82 mPa·s. Carbon disulfide that is 28% of a weight ratio of $\alpha$-cellulose is added in a yellowing process, and the yellowing is performed at an initial temperature of 24° C. and a termination temperature of 29° C. to obtain cellulose xanthate. At last, the cellulose xanthate is subjected to dissolution, filtration, and defoaming to obtain the viscose spinning solution with an $\alpha$-cellulose content of 8.85 wt. %, an alkali content of 4.76 wt. %, a viscosity of 52 s, and a maturity of 11 ml.

Spinning: The fruit extract mixed solution obtained in step (1) and the viscose spinning solution obtained in step (2) are uniformly mixed by pre-spinning injection, where a weight ratio of the fruit extract in the fruit extract mixed solution to $\alpha$-cellulose in the viscose spinning solution is 0.013:1. After that, wet spinning with an acid bath is performed, where the acid bath includes sulfuric acid with a concentration of 80 g/L, zinc sulfate with a concentration of 5 g/L, and sodium sulfate with a concentration of 260 g/L, and has a temperature of 45° C. After the spinning is completed, the processes of drafting, plasticization, cutting, acid pickling, desulfurization with sodium sulfite, water washing, oiling, and drying are sequentially performed, and then the composite fiber containing a fruit extract is obtained.

Example VI: A method for preparing a fruit extract leather includes the following steps:
(1) extracting juiced fruit peels and/or fruit kernels to obtain a powdery fruit extract and a remaining residue for spare use;
(2) sequentially adding the fruit extract, a dispersing agent, and a cross-linking agent to water, performing uniform mixing, heating, and heat preservation, and then performing filtration to obtain a supernatant, namely a fruit extract mixed solution, and a residue for spare use;
(3) preparation of a viscose spinning solution: performing impregnation, pressing, pulverization, aging, yellowing, dissolution, filtration, and defoaming on pulp to obtain a viscose spinning solution;
(4) spinning: uniformly mixing the fruit extract mixed solution obtained in step (2) and the viscose spinning solution obtained in step (3) by pre-spinning injection, performing spinning to obtain a composite fiber containing a golden fruit extract, and then performing yarn spinning to obtain a base fabric;
(5) grinding the residues obtained in step (1) and step (2), and adding the ground residues to a prepolymer material A to obtain a composite prepolymer material A; and
(6) compounding the obtained base fabric, composite prepolymer material A, and a prepolymer material B to obtain a finished product.

The method further includes post-processing steps: after the spinning is completed, sequentially performing drafting, plasticization, cutting, refining, and drying, and after the steps are completed, obtaining a composite fiber containing a fruit extract.

In step (2), the fruit extract mixed solution has a solid content of 10%, and a weight ratio of the fruit extract in the fruit extract mixed solution to $\alpha$-cellulose in the viscose spinning solution is 0.1:1.

Preparation of the fruit extract mixed solution: The fruit extract, sodium dodecylbenzenesulfonate, fatty alcohol polyether, dimethylolurea, and dimethylol ethyleneurea are sequentially added to water, where a weight ratio of the fruit extract to the sodium dodecylbenzenesulfonate to the fatty alcohol polyether to a combination of the dimethylolurea and the dimethylol ethyleneurea to the water is 1:0.05:0.05:8:5. The above-mentioned substances are uniformly mixed, heated to 80° C., and subjected to heat preservation for 30 min to obtain a mixture. Then, the mixture is sequentially filtered with a 300-mesh filter screen, a 400-mesh filter screen, and a 500-mesh filter screen. A bottom residue is removed, and a supernatant is taken to obtain the fruit extract mixed solution.

Preparation of the viscose spinning solution: Short-filament wood pulp is subjected to impregnation in a sodium hydroxide solution, and then subjected to pressing, pulverization, and aging to obtain an alkali cellulose with a copper ammonia viscosity of 80 mPa·s. Carbon disulfide that is 36% of a weight ratio of α-cellulose is added in a yellowing process, and the yellowing is performed at an initial temperature of 28° C. and a termination temperature of 33° C. to obtain cellulose xanthate. At last, the cellulose xanthate is subjected to dissolution, filtration, and defoaming to obtain the viscose spinning solution with an α-cellulose content of 8.89 wt. %, an alkali content of 4.89 wt. %, a viscosity of 54 s, and a maturity of 12 ml.

Spinning: The fruit extract mixed solution obtained in step (1) and the viscose spinning solution obtained in step (2) are uniformly mixed by pre-spinning injection, where a weight ratio of the fruit extract in the fruit extract mixed solution to α-cellulose in the viscose spinning solution is 0.267:1. After that, wet spinning with an acid bath is performed, where the acid bath includes sulfuric acid with a concentration of 80 g/L, zinc sulfate with a concentration of 5 g/L, and sodium sulfate with a concentration of 260 g/L, and has a temperature of 45° C. After the spinning is completed, the processes of drafting, plasticization, cutting, acid pickling, desulfurization with sodium sulfite, water washing, oiling, and drying are sequentially performed, and then the composite fiber containing a fruit extract is obtained.

It should be finally noted that the foregoing descriptions are merely preferred embodiments of the present invention, but are not intended to limit the present invention. Although the present invention has been described in detail with reference to the foregoing embodiments, for a person of ordinary skill in the art, modifications can be made to the technical solutions described in the foregoing embodiments, or equivalent replacements can be made to some technical features in the technical solutions. Any modification, equivalent replacement, or improvement made within the spirit and principle of the present invention shall fall within the protection scope of the present invention.

What is claimed is:

1. A fruit extract leather, comprising:
   a prepolymer material A,
   a prepolymer material B, and
   a base fabric,
   wherein the prepolymer material A comprises a fruit powder, and the fruit powder is obtained by:
      extracting peels and/or fruit kernels from one or more juiced fruits to obtain a powdery fruit extract and a remaining residue material and
      grinding the remaining residue material obtained from the extraction; and
   wherein the base fabric is obtained by:
      uniformly mixing a fruit extract mixed solution prepared from the fruit extract, and a viscose spinning solution by pre-spinning injection to obtain a mixture,
      performing spinning on the mixture to obtain a composite fiber, and
      performing yarn spinning on the composite fiber to obtain the base fabric.

2. The fruit extract leather according to claim 1, wherein the prepolymer material A has the fruit powder content of 20%-50% by weight percentage.

3. The fruit extract leather according to claim 1, wherein the fruit powder comprises one or more of apples, lemons, and oranges.

4. The fruit extract leather according to claim 1, wherein the prepolymer material B is an isocyanate prepolymer.

5. The fruit extract leather according to claim 1, wherein a weight ratio of the prepolymer material A to the prepolymer material B is 1 by 1.

6. The fruit extract leather according to claim 1, wherein the fruit extract mixed solution has a solid content of 10%.

7. The fruit extract leather according to claim 1, wherein the fruit extract mixed solution is obtained by sequentially adding the fruit extract, a dispersing agent, and a cross-linking agent to water, and wherein the viscose spinning solution is obtained by performing at least one of: impregnation, pressing, pulverization, aging, yellowing, dissolution, filtration, and defoaming on a pulp.

8. The fruit extract leather according to claim 7, wherein the pulp is one of: a short-filament cotton pulp or a short-filament wood pulp.

* * * * *